(12) United States Patent
Hanley

(10) Patent No.: US 11,602,130 B2
(45) Date of Patent: Mar. 14, 2023

(54) PET COLLAR AND LEASH STORAGE APPARATUS

(71) Applicant: Jerome C. Hanley, Fort Collins, CO (US)

(72) Inventor: Jerome C. Hanley, Fort Collins, CO (US)

( * ) Notice: Subject to any disclaimer, the term of this patent is extended or adjusted under 35 U.S.C. 154(b) by 0 days.

(21) Appl. No.: 16/995,484

(22) Filed: Aug. 17, 2020

(65) Prior Publication Data
US 2021/0045355 A1    Feb. 18, 2021

Related U.S. Application Data

(60) Provisional application No. 62/887,482, filed on Aug. 15, 2019.

(51) Int. Cl.
*A01K 27/00*    (2006.01)

(52) U.S. Cl.
CPC .......... *A01K 27/001* (2013.01); *A01K 27/003* (2013.01)

(58) Field of Classification Search
CPC ... A01K 27/001; A01K 27/003; A01K 27/008
USPC .......................................... 119/792, 793, 794
See application file for complete search history.

(56) References Cited

U.S. PATENT DOCUMENTS

| | | | |
|---|---|---|---|
| 2,799,245 A * | 7/1957 | Ruggiero | A01K 27/004 242/381.1 |
| 3,884,190 A | 5/1975 | Gurrey et al. | |
| 4,202,510 A * | 5/1980 | Stanish | A01K 27/004 242/384.7 |
| 5,099,799 A | 3/1992 | Giacobbe | |
| 5,711,255 A * | 1/1998 | Rudolph | A01K 27/001 119/793 |
| 5,947,062 A | 9/1999 | Hoffman et al. | |
| 6,367,428 B1 | 4/2002 | Forte | |
| 6,481,382 B2 | 11/2002 | Cohn | |
| 6,581,547 B1 | 7/2003 | Austin | |
| 7,281,495 B2 | 10/2007 | Wagner | |
| D640,840 S | 6/2011 | Reed | |
| 8,613,262 B1 * | 12/2013 | Mergard | A01K 27/001 119/858 |

(Continued)

OTHER PUBLICATIONS

RadDog All-In-One Collar + Leash; retrieved Jul. 22, 2019; https://www.niteize.com/product/RadDog-All-ln-One-Collar-Leash.asp. 7 pages.

(Continued)

*Primary Examiner* — Magdalena Topolski
*Assistant Examiner* — Edgar Reyes
(74) *Attorney, Agent, or Firm* — Wiedmann Law LLC

(57) ABSTRACT

A storage apparatus for a pet collar and a pet leash wearable by a pet may be described as an annular sheath that includes an inner base component, and first and second walls that, together with the inner base component, define a channel in which a collar for a pet, and an attached leash, can be stored. Particular embodiments provide an improved apparatus that is snag-free, provides for convenient and facile storage (of collar and leash) and facile re-storage of an extended/removed leash. Side walls may be elastically biased towards each other to help secure a stored collar (and leash) within a channel of the sheath. Particular embodiments may include, inter alia, collar unbuckling facilitators and/or a band located at a sheath separation site.

20 Claims, 13 Drawing Sheets

(56) References Cited

U.S. PATENT DOCUMENTS

| | | | |
|---|---|---|---|
| 9,961,882 B2* | 5/2018 | Woods | A01K 27/009 |
| 10,188,080 B2* | 1/2019 | Jasmine, Sr. | A01K 29/00 |
| D844,907 S | 4/2019 | Farrar | |
| 11,166,506 B2* | 11/2021 | Roberson | A41F 9/025 |
| 2005/0081799 A1* | 4/2005 | Huntley, III | A01K 27/001 |
| | | | 119/858 |
| 2006/0137625 A1 | 6/2006 | Conte | |
| 2017/0311573 A1* | 11/2017 | Sigmon | E05B 65/00 |

OTHER PUBLICATIONS

Co-leash dog collar dog leash collar and leash combined; retrieved Jul. 22, 2019; http://coleash.com/. 4 pages.

Limited-Slip Dog Leash & Collar Combination; retrieved Jul. 22, 2019; https://www.petexpertise.com/slip-leash-collar-combination/. 3 pages.

All Ready Leash Dog Collar_Leash Combo—YouTube; retrieved May 17, 2019; https://www.youtube.com/watch?v=_GHU_SSBec4. Screenshot, 1 page.

U.S. Appl. No. 62/887,482, filed Aug. 15, 2019. First Named Inventor: Hanley.

\* cited by examiner

PET COLLAR AND LEASH STORAGE APPARATUS

This US Non-provisional Patent Application claims priority to U.S. Provisional Application Ser. No. 62/887,482, filed Aug. 15, 2019, said provisional application incorporated herein, by reference, in its entirety.

BACKGROUND OF THE INVENTION

Generally, this invention relates to a storage apparatus for a pet collar and a pet leash, that is wearable by a pet. Specifically, in particular embodiments, it relates to an annular sheath and presents a unique system to combine, retain, and attach a collar and leash (and associated componentry) in one apparatus.

The desire to combine a collar and leash into one package stems from the frustration of needing to keep a pet under control and not having a leash on hand. Another problem, from the consumer's perspective, has been the desire for the collar leash system to be stream-lined and out of harm's way. This invention allows the pet to carry their own leash while safely keeping the leash enclosed to minimize the danger of the leash becoming entangled/snagged.

Perhaps another significant problem that those in this field have faced is the fact that once the leash is attached to the collar it can become bulky and/or difficult or tedious to manipulate. Particular embodiments allow for efficient and facile operation (while also avoiding snagging). This allows the animal to have the leash on at all times and not be bothered by its shape or mass.

This apparatus, in embodiments, can be designed so it can be used on a full-time basis or be used combined with any other leash. In certain embodiments, it can be used with off-the-shelf collars and leashes (including their respective attachment componentry), perhaps already owned by a consumer.

SUMMARY OF THE INVENTION

The present invention includes a variety of aspects which make embodiments unique. In some embodiments, this apparatus is streamlined and very safe for the animal. In other or the same embodiments, the collar portion may be perforated (with holes) for easy drying and cleaning. It presents a storage channel in which the collar and leash are stored. In some embodiments, the leash collar can be adjustable to fit variously sized animals. It may include a band that facilitates attachment of the apparatus around a pet collar; it may include collar unbuckling facilitators (e.g., opposing buttons, holes on first and second walls, or sets thereof, and/or flexible first and second walls of the apparatus).

Accordingly, a broad goal of the invention is to provide for the consumer to always have a leash on hand and ready to use. The leash can be stored within the apparatus, with the collar, and can be extended, used in typical fashion, perhaps removed if desired, and reattached (if removed), and re-stored in the apparatus, with little effort, all while the apparatus remains on the pet (e.g., around the pet's neck). When the leash is extended and used (or even removed), the collar may remain within the apparatus (stored within the annular sheath), secured around the pet's neck (while the apparatus is secured around the pet's neck also), because it is substantially around the collar that is secured around the pet's neck.

Another goal is that the apparatus, while it is storing a collar (and leash) may be streamlined, substantially without protrusions therefrom, and not be needed to be removed due to discomfort or risk caused to the animal.

In keeping with a goal of meeting the consumer's needs, a goal can be to provide a system which is both easily used with the integral collar and leash. In some embodiments, this may be accomplished with an attached ring that is available for a traditional leash to connect to and/or for identification tags (indeed, the apparatus may be sized so as to even store such ID tags, along with the collar, its attachment componentry, and the leash, and its componentry). This can allow the owner to use a standard leash but when one is not available, to always have a leash on hand.

Convenient leash access may help to prevent accidents, dog fights, etc., that might occur where the pet breaks free from control.

Naturally further objects of the invention are disclosed throughout other areas of the specification and claims.

DESCRIPTION OF THE PREFERRED EMBODIMENTS

Figure 1:
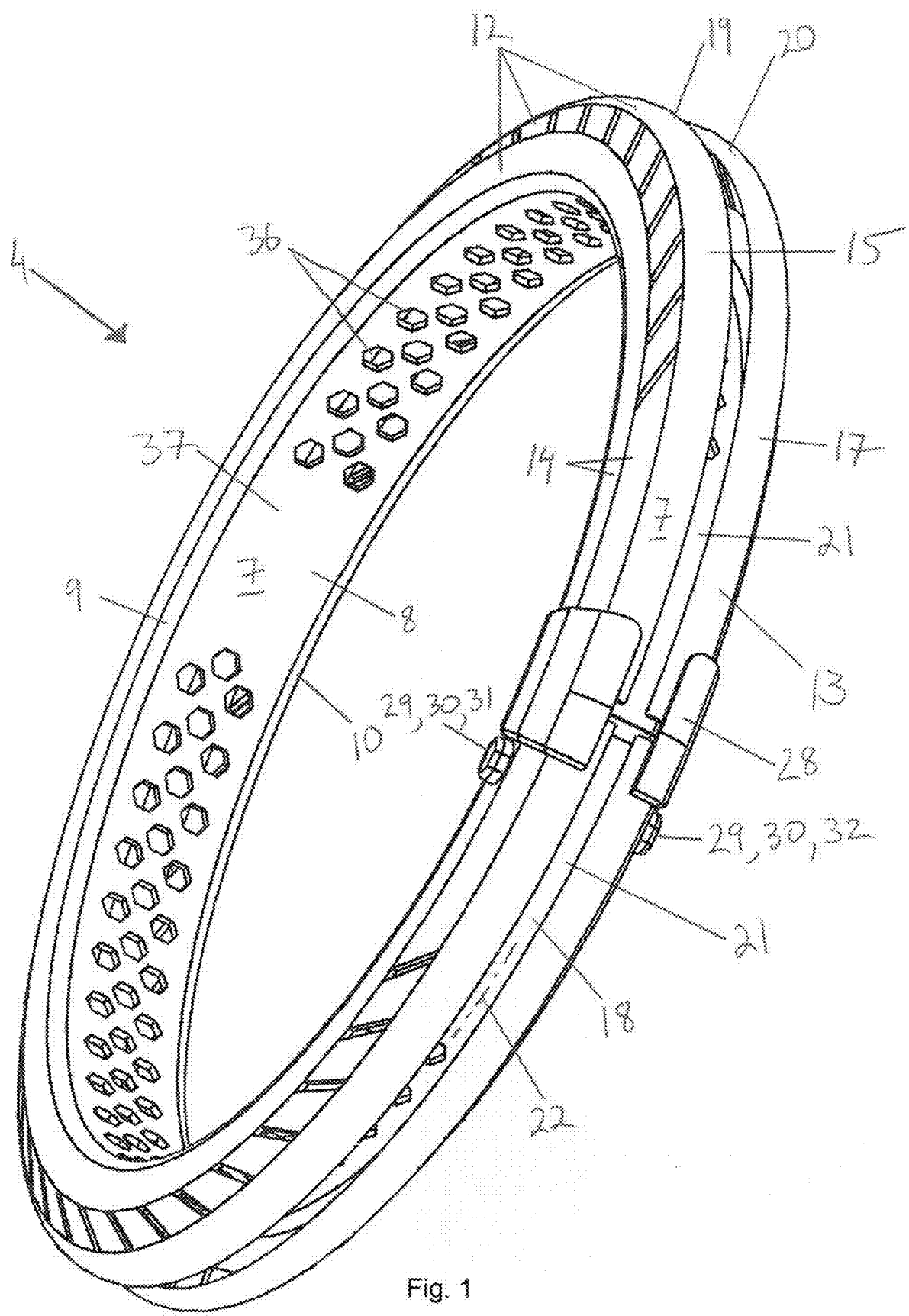
FIG. 1 shows a perspective side view of an embodiment of the inventive technology. This, like all figures, show the apparatus in an undonned configuration.
Figure 2:
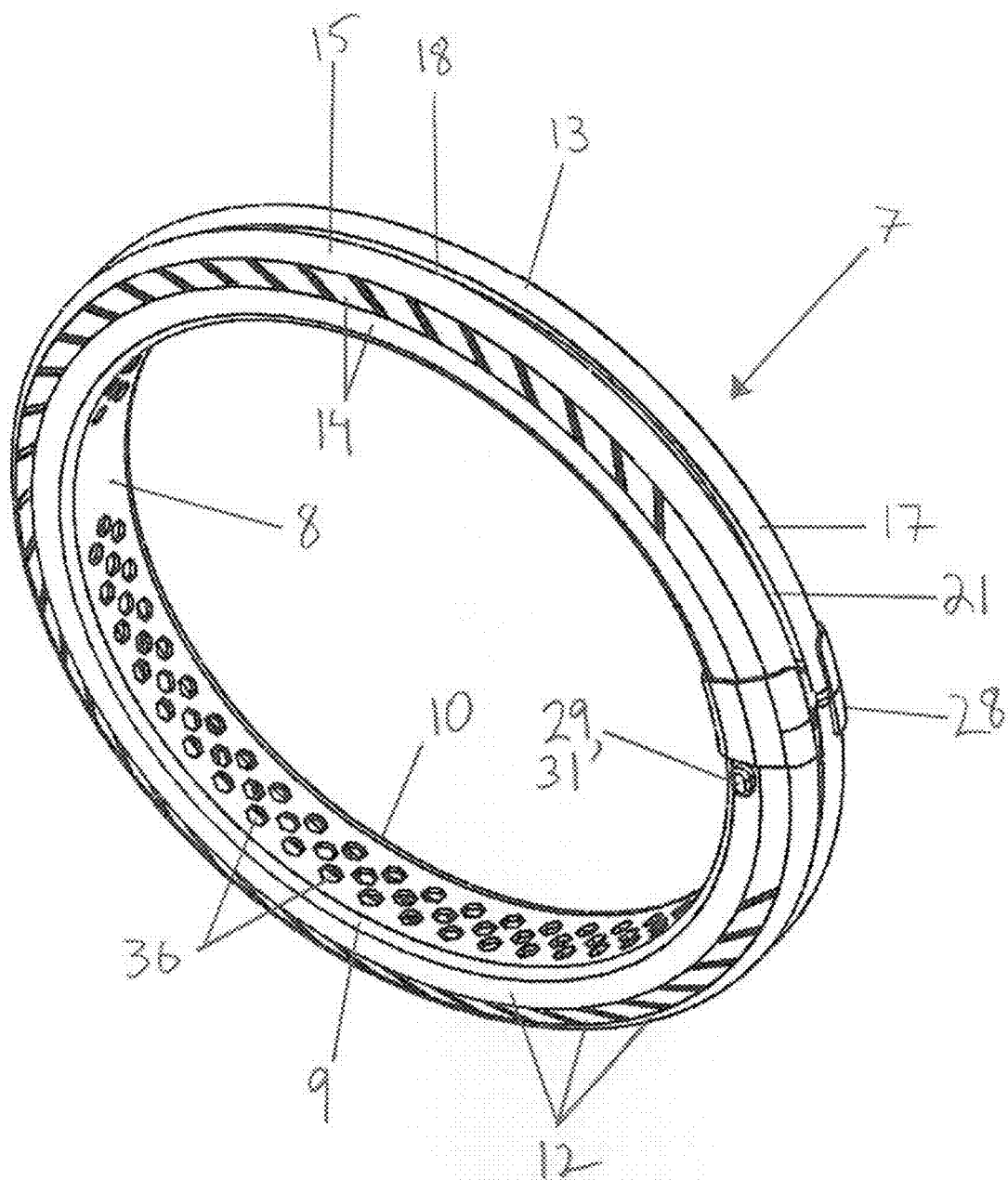
FIG. 2 shows a perspective side view of an embodiment of the inventive technology.
Figure 3:
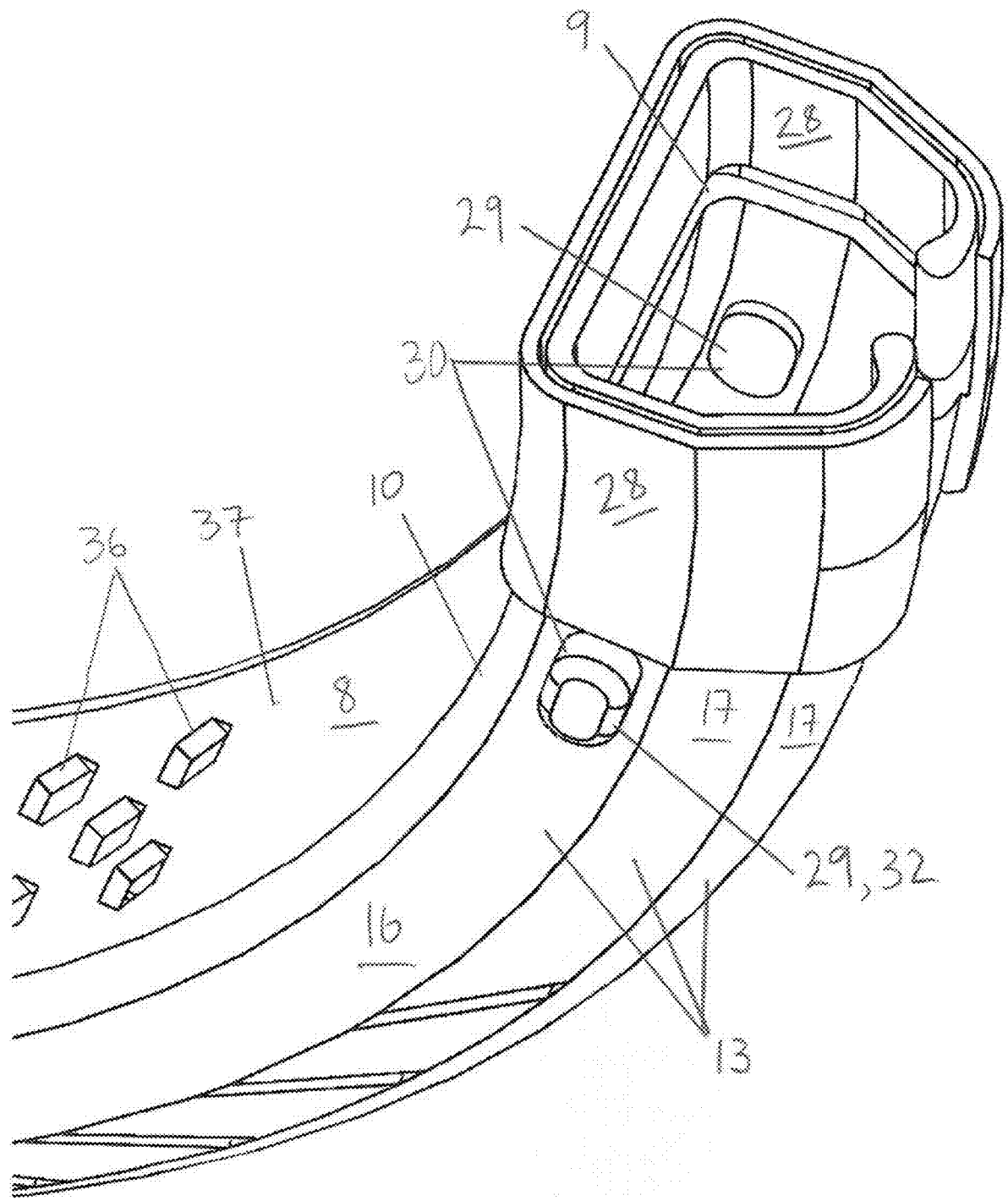
FIG. 3 shows a perspective side view of an end of a portion the annular sheath of embodiment of the inventive technology.
Figure 4:
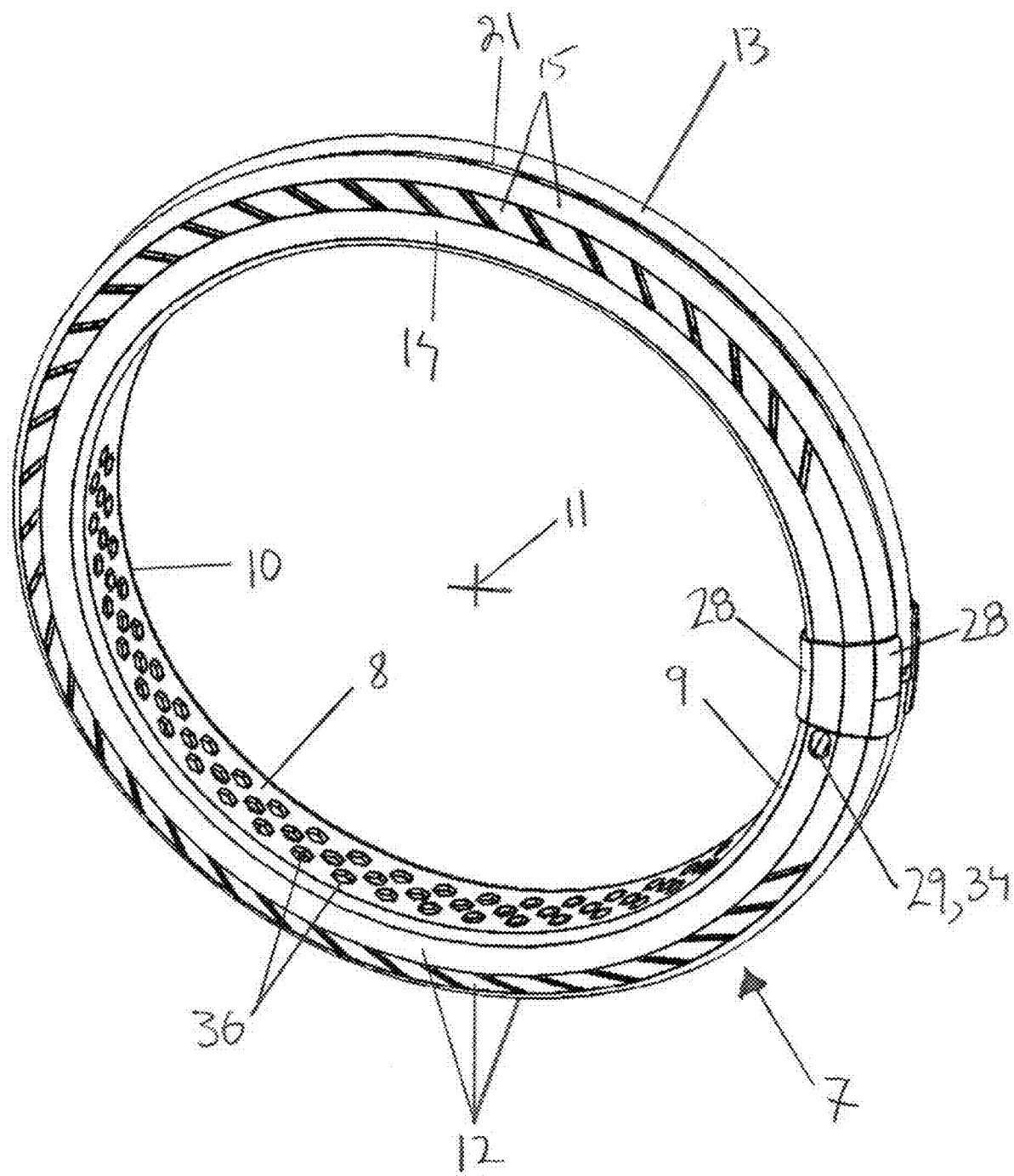
FIG. 4 shows a perspective side view of an embodiment of the inventive technology.
Figure 5:
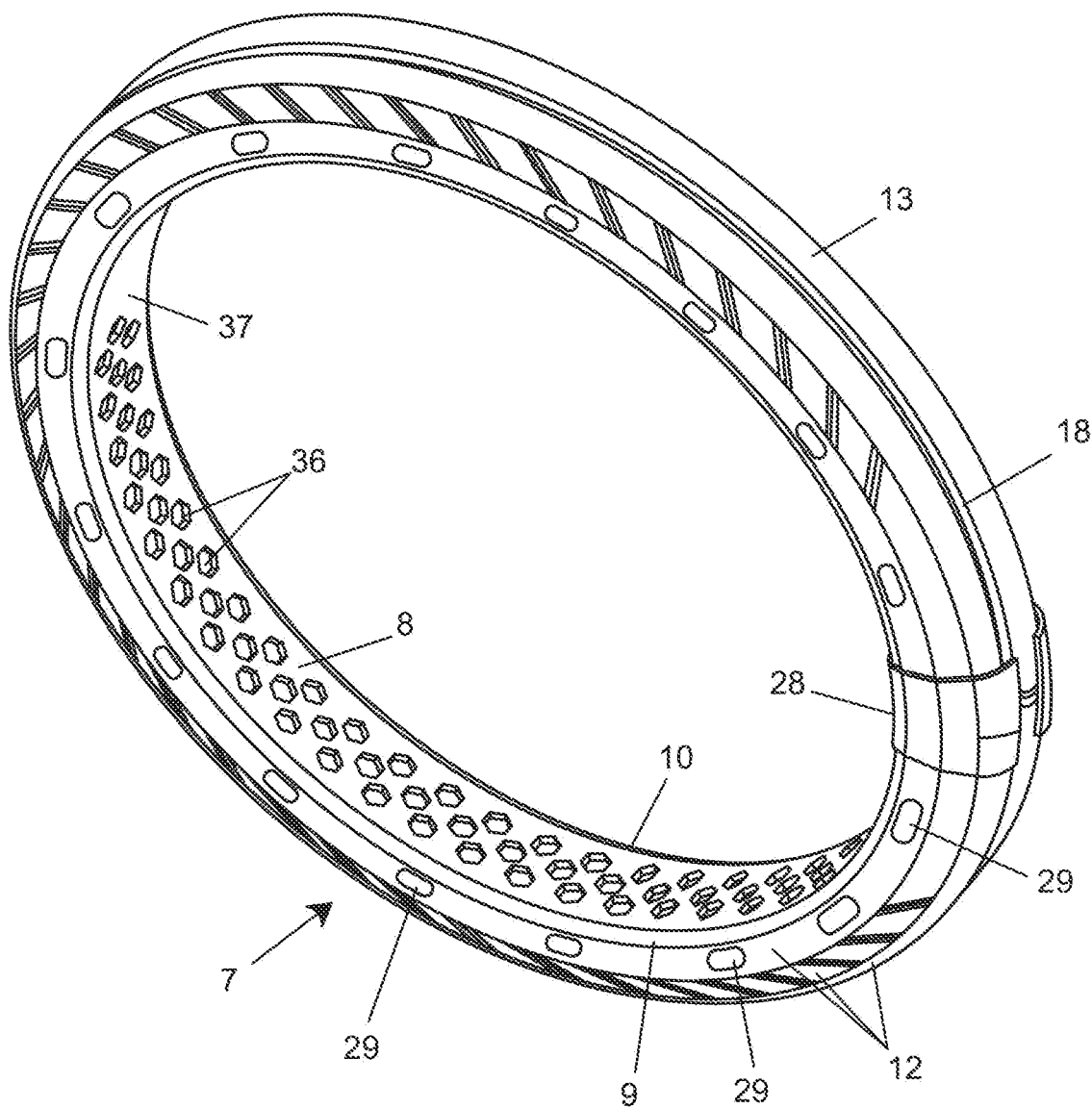
FIG. 5 shows a perspective side view of an embodiment of the inventive technology.
Figure 6:
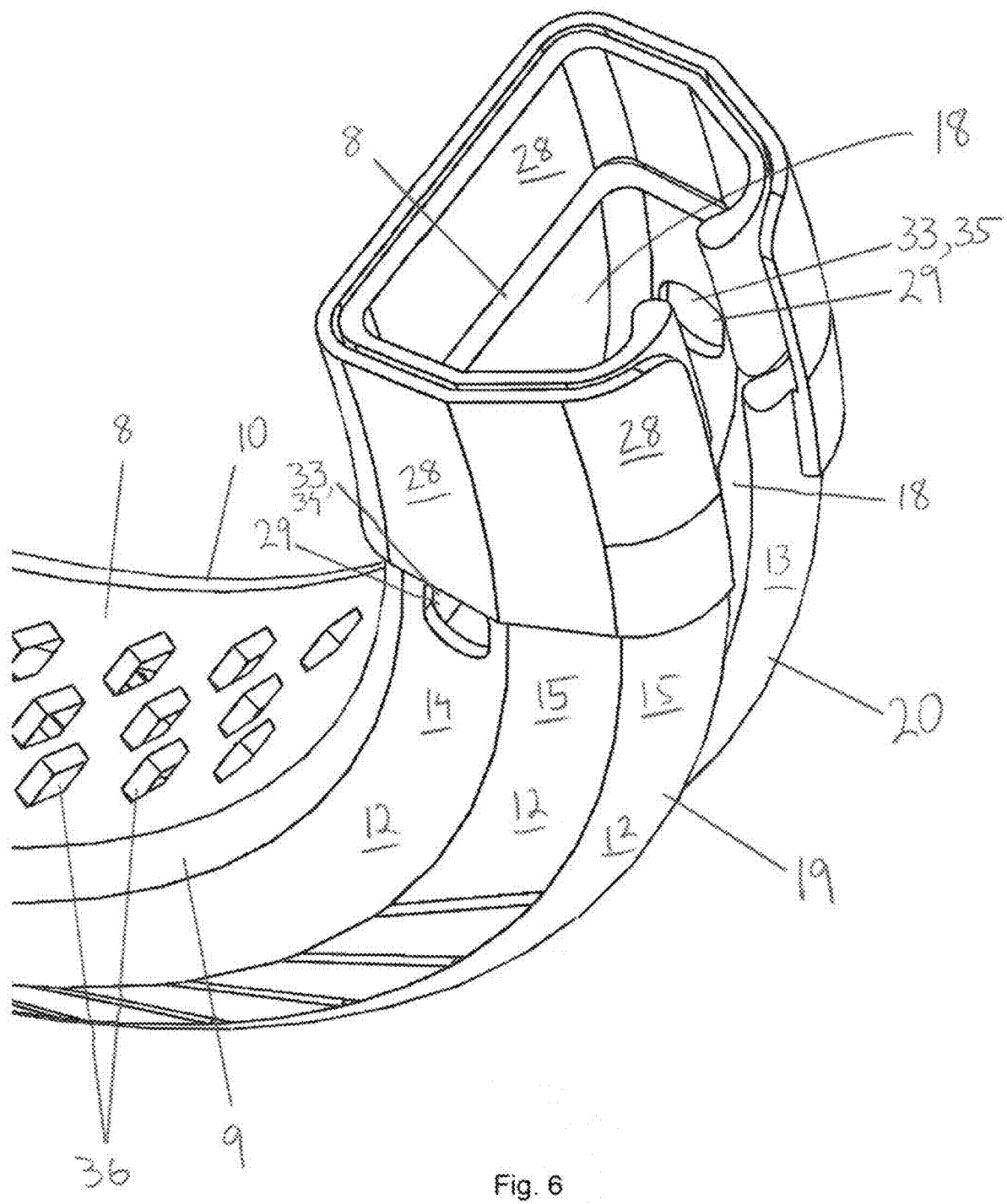
FIG. 6 shows a perspective side view of an end of a portion the annular sheath of embodiment of the inventive technology.
Figure 7:
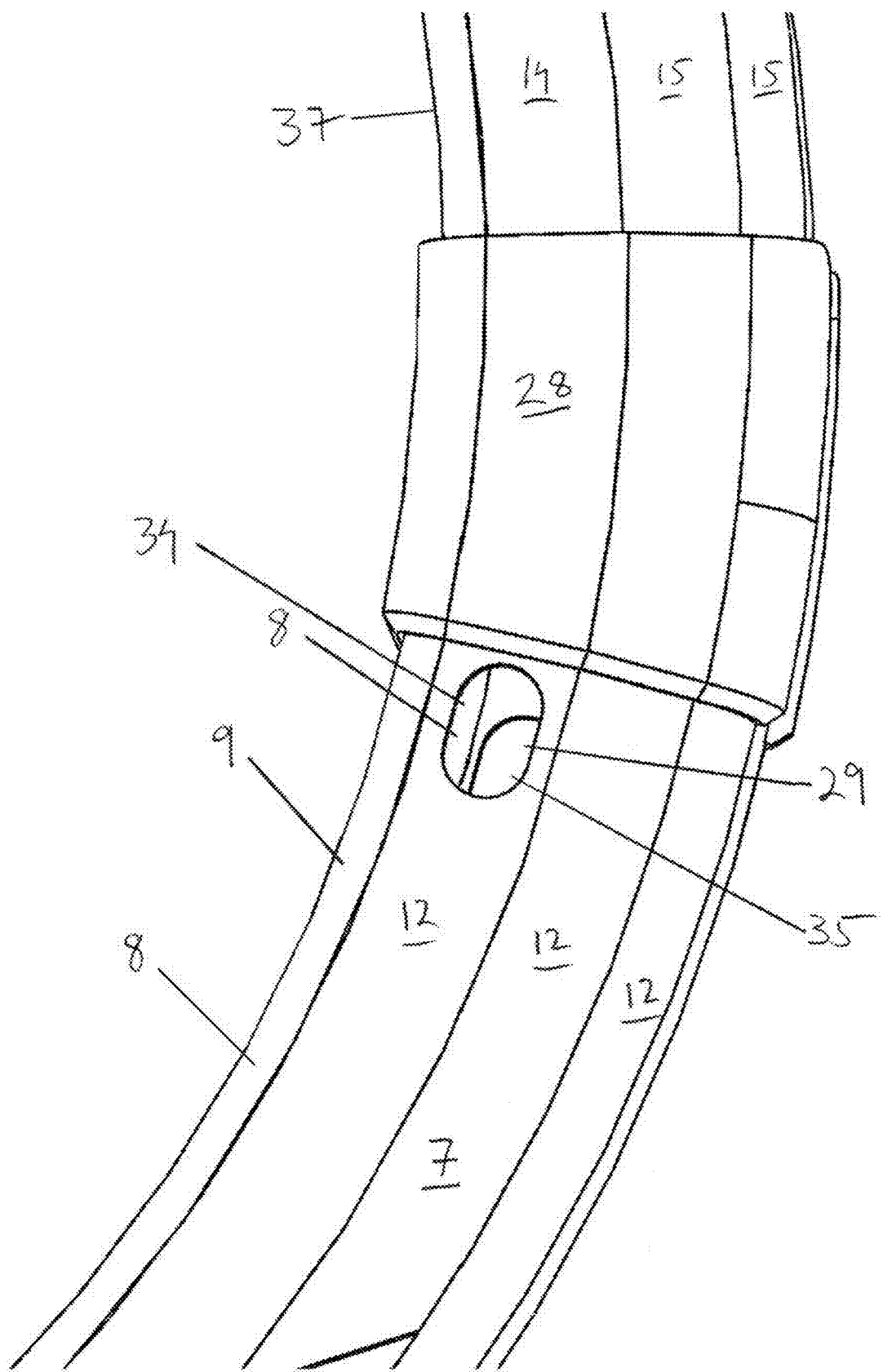
FIG. 7 shows a perspective side view of a portion of the annular sheath of an embodiment of the inventive technology.

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Certain embodiments of the inventive technology may be described as a storage apparatus 4 for a pet collar 5 and a pet leash 6, and wearable by a pet (i.e., animal, whether a dog, cat, ferret, zoo animal, etc.) The wearable storage apparatus may be described as an annular sheath 7 that itself comprises an inner base component 8 having a first inner base component side 9 and a second inner base component side 10 (perhaps each is substantially at an outer edge of the inner base component). The term inner suggests that it is closer to a centroid 11 defined by the annular sheath (as opposed to outer, which would imply that it is further away from that centroid). The annular sheath may also include a first wall 12 and a second wall 13 (side walls, such as perhaps elastic flanges as but one of many examples) established outside of the inner base component, each of such two walls having a first portion 14, 16 (e.g., an inner half, measured via a radial distance) and a second portion 15, 17 (e.g., an outer half). Any wall has two such portions: a first at the first half of the radial height from the inner base component; and the second starting at that first half height to the upper terminus of the wall (the outermost second portion). Such walls, in conjunction with the inner base component, may define a channel 18 (e.g., collar and leash storage channel) located outside of the inner base component and between the two walls. The channel may be located outside of the inner base component and between the first and second walls.

Figure 8A:
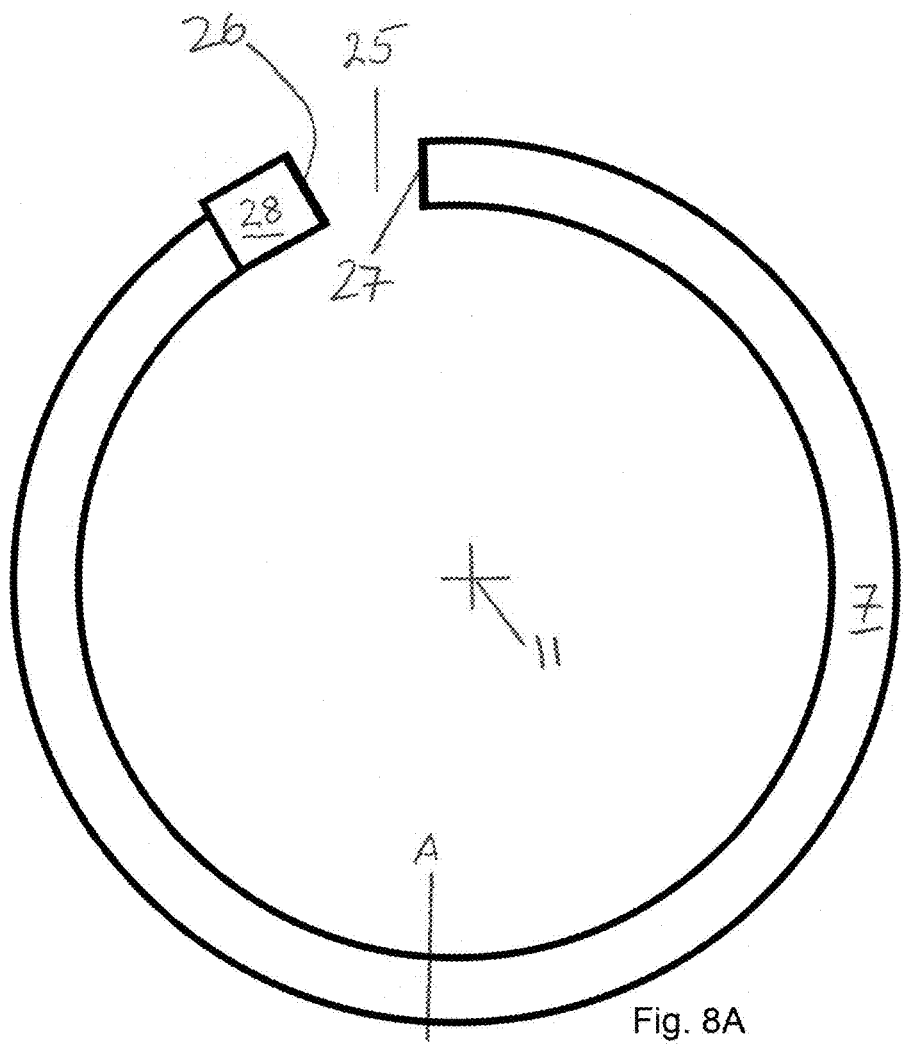
FIG. 8A shows a side view of an embodiment of the inventive technology.

In some embodiments, the annular sheath may represent a vehicle tire that is off of the wheel and that is inverted so that its exposed circumferential opening faces outward (not inward like a "normal" non-inverted vehicle tire). However, and notably, the inner base component 8 need not be flat/straight (in radial cross-section), although as shown in the figures, it certainly can be. Indeed, it could have a variety of shapes, as could the walls—when viewed from the side, the inner base component and the side walls together could be virtually any shape because the sheath could have any of a variety of (radial) cross-sections (perhaps each with an opening in such shape), e.g., oval, circular, hexagonal, entirely curved, having straight and curved sections, etc. (the inner base component of the annular sheath, regardless of its overall cross-sectional shape, could be the inner portion of such sheath, and the walls could extend outwards from the sides of that inner base component). The term "annular" (of the sheath) means that in its position off of the pet (undonned configuration), it will assume an annular shape, where annular includes round, circular, oval, hexagonal, octadecagonal, curved, made up of segmented straight, curved and straight, etc. even though it may be split/separated substantially along a radius at a separation site (see, e.g., FIG. 8A). The sheath may be pre-formed to assume an annular shape when in relaxed, undonned configuration.

The second portion 15 of the first wall may be located outside of the first portion 14 of the first wall, and the second portion 17 of the second wall may be located outside of the first portion 16 of the second wall. The first portion may be the inner half of each wall (and the second, the outer half of that wall, where inner means closer to the centroid of the annular sheath and outer means further from that centroid). The first portion of the first wall may be connected to the inner base component at the first inner base component side 9 and the first portion of the second wall may be connected to the inner base component at the second inner base component side 10.

In certain embodiments, as shown in the figures, the annular sheath is designed so that is walls and inner base component are established around the centroid of the sheath, such that the inner base component is always inside the walls (i.e., the base component is nearer to the centroid than are the walls), perhaps with a perimetrical split 21 between outermost second portions 19, 20 of the walls (e.g., facing outwards, away from the centroid of the apparatus), substantially outside of the channel.

As suggested, the second portions of the first and second walls may each have an outermost second portion 19, 20; such outermost second portions may together define an outer sheath perimeter 22 (perhaps between such outermost second portions). When the annular sheath is in a non-storing configuration (i.e., where the collar and leash are not stored in the sheath), the channel may be partly exposed along a perimetrical split 21 along the outer sheath perimeter 22 (e.g., as where such outermost second portions are out of contact (not in contact) with each other, such that the channel is visible), or the channel may be not exposed (unexposed) along that perimetrical split (e.g., as where such outer most second portions are in contact with each other, such that the channel is not visible). The channel may be sized to accept a pet collar, which includes collar attachment componentry 23 (a term that includes, e.g., a ring such as a D-ring that to which the leash may be attached), and leash (which may includes leash attachment componentry 24).

A separation site 25 may split the annular sheath in a radial direction (e.g., as if an inverted tire were cut along a radius, in one embodiment, as a very rough description). Two ends 26, 27 of the annular sheath may be proximate each other and located at the separation site. Note that separation means merely that the annular sheath can be manually separated at such site; the two ends may indeed be connected (e.g., the sheath is worn by a pet, even where the connection is somewhat loose). Having the sheath separable may facilitate, even allow, the placement of the sheath on a pet's neck.

Two ends may be proximal to each other and located at separation site that splits the annular sheath in a radial direction. Such split may facilitate placement of the sheath over a pet's neck. That split may also help to accommodate use of the apparatus on pets having different sized necks: in larger dogs, the two ends may be separated from one another (so the sheath is properly snug around the pet's neck); in smaller dogs, one of the two ends may be fit into another, perhaps in a telescoping manner (so the sheath is properly snug around the pet's neck). Because there is a limit as to the extent to which a single collar can be enlarged or shortened (in circumference) using such methods, there may be provided different sizes of sheaths, each accommodating a range of neck sizes (likely given in circumference). There may also be provided certain widths of sheaths to accommodate different widths (and perhaps even thicknesses) of collars and leashes.

In certain embodiments, a band 28 may be connected at and forming one of such two ends; that band may have an interior sized so it has a cross-sectional area/shape that is (slightly) larger than that defined by the cross-sectional area/shape of the end of the annular sheath to which the band is not attached, in order to be able to receive that other end. Whether or not a band exists, at least one of the two ends may, in certain embodiments, fit within, and be slidable into, the other of the two ends. The band, in length (perimetrical, e.g., circumferential length), may be less than one-fourth or even less than one-tenth of the entire perimetrical (e.g., circumferential) length of the annular sheath. Note that in certain embodiments, when one end is inserted into the other (if there is a band, the other end may be inserted into the band), such connection can be relatively loose (i.e., easy to disconnect), because when around pet's neck, and with a buckled pet collar stored therein, the collar (when wrapped around the annular sheath) provides the structural strength needed to keep the annular sheath on and around the pet's neck.

Certain embodiments may include a pet collar unbuckling facilitator 29 that facilitates manual unbuckling of a pet collar buckled and stored inside of the channel of the annular sheath. The pet collar unbuckling facilitator may include at least one set of two push buttons 30, a first of which (e.g. a first button 31) is established on the first wall and a second of which (a second button 32) is established on the second wall opposite the first push button. It may include at least one set of two collar unbuckling facilitator holes 33, a first 33 of which is established in the first wall and a second 34 of which is established in the second wall opposite the first collar unbuckling facilitator hole 33. Note that there may be a plurality of either of such sets around the circumference of the two walls. In use, after a side release buckle of a collar, in attached configuration, is manually positioned substantially between a set of such facilitators, it may then be easy for a human user (a handler) to, without having to establish fingers (e.g., finger and thumb) inside the channel, on either side of the side release buckle, simply pinch, from the outside of the sheath and at two unbuckling facilitators of a set, the two release flanges of the side release buckle towards each other, thereby unbuckling them. Note that that the pet collar unbuckling facilitator may, in certain embodiments, be portions 38 of the first and second walls (e.g., the first portions) that are easily deformable by manual pressure exerted by a human finger and thumb. Note that sheaths with any type of pet collar unbuckling facilitator may still be used on collars without side release buckles but only collars with side release buckles may benefit from the use of sheaths with such facilitators (e.g., on opposite sides of the two walls of the sheath). For clarity, a side release buckle is a known type of collar attachment componentry (for securing the collar around a pet's neck), with two opposing buttons that, when pinched together, allow for detachment, and allows for quick "snap" attachment upon forcing one portion of the buckle into the other; it may be considered a part of the collar, and more specifically a type of collar attachment componentry.

As mentioned, the annular sheath, when, e.g., it is in a non-storing configuration (i.e., it is not storing within it either a collar or a leash (or their attachment componentry)), and undonned configuration (where it is not being worn by a pet), may define a centroid of a shape (e.g., circular, oval, etc.). It may also define such shape when it is in a storing configuration and donned by a pet. In certain embodiments, the second portion of the first wall and the second portion of the second wall may converge towards each other as distance of the second portions from the centroid increases when the annular sheath is in a non-storing, undonned configuration. Such portions may also be biased (e.g., elastically) towards each other, and indeed inwardly (toward the centroid), so as to help retain the stored collar and leash (and their attachment componentry) in the channel of the sheath.

The inner base component, and/or side walls may include holes 36 to allow for drying of a wet collar and/or leash that is stored in the annular sheath. Holes in the side wall may also, in certain embodiments, double as pet collar unbuckling facilitator.

In certain embodiments, a pet proximate inner surface 37 of the inner base component (i.e., inner base component surface closest to the centroid defined by the sheath) is sufficiently slick to facilitate spinning of the annular sheath around a neck of a pet, e.g., when the leash is "spun" out of its storage location (wrapped inside of the sheath, which is around the pet's neck) during extension of the leash from the sheath. This is an advantageous type of quick deployment of the leash from its storage configuration in the annular sheath's channel. Note that the slickness can be achieved via any known manner, e.g., through the use of UHMW material, wax, surface treatment, slick sheet adhered to inner surface of inner base component, slick adhesive sheet, etc.

Note that in certain embodiments, the entire perimetrical split (e.g., circumferential split) of the channel of the sheath may, advantageously, act as a re-entry site for the initial part of the storage process of the collar and/or leash. The annular sheath may, in certain embodiments, be said to be retrofittable in that it can be used on and with existing, already owned, pet collars and leashes (and their collar and leash attachment componentry). The collar can be manufactured of any known materials, e.g., flexible plastic, elastomer, nylon, UHMW, blend, etc., using any known manufacturing methods, e.g., extrusion, molding, 3D printing, etc. In certain embodiments, because the collar is stored in the apparatus and has structural integrity (i.e., is strong enough for its intended use in restraining a dog via the attached least), the annular sheath need not be strong enough to resist anticipated leash forces (because the collar stored in it provides such material strength). Certain embodiments may even include a hinge opposite a separation site to facilitate placement of the sheath on a pet's neck.

Note that in certain variant embodiments, the annular sheath may include two channels, one inside of a base component, and another that is outside of that base component. The inner channel, created by the base component (such base component would act as a ceiling for that inner channel) and two inner walls on either side and inside of the base component, would store the dog collar, and the outer channel, created by the base component (as a floor for that outer channel) and two outer walls on either side and outside of the base component, would store the leash. There may be provided a hole(s) in the base component so the leash could be attached to the collar (leash attachment componentry would be situated through and at such hole).

Figure 8B:
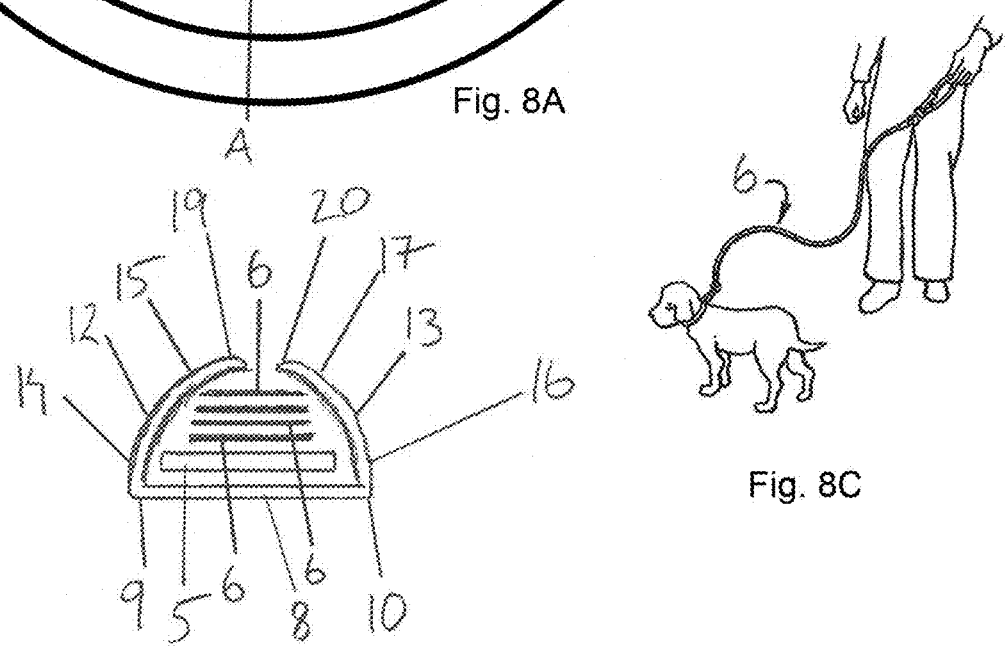
FIG. 8B shows a cross-sectional view (at section A-A) as may appear in an embodiment of the inventive technology (in storing configuration)
Figure 8C:
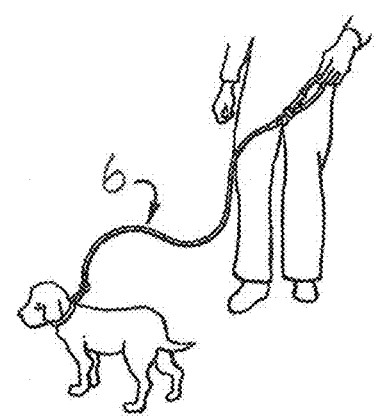
FIG. 8C shows an embodiment of the inventive technology in donned, non-storing configuration.
Figure 9:
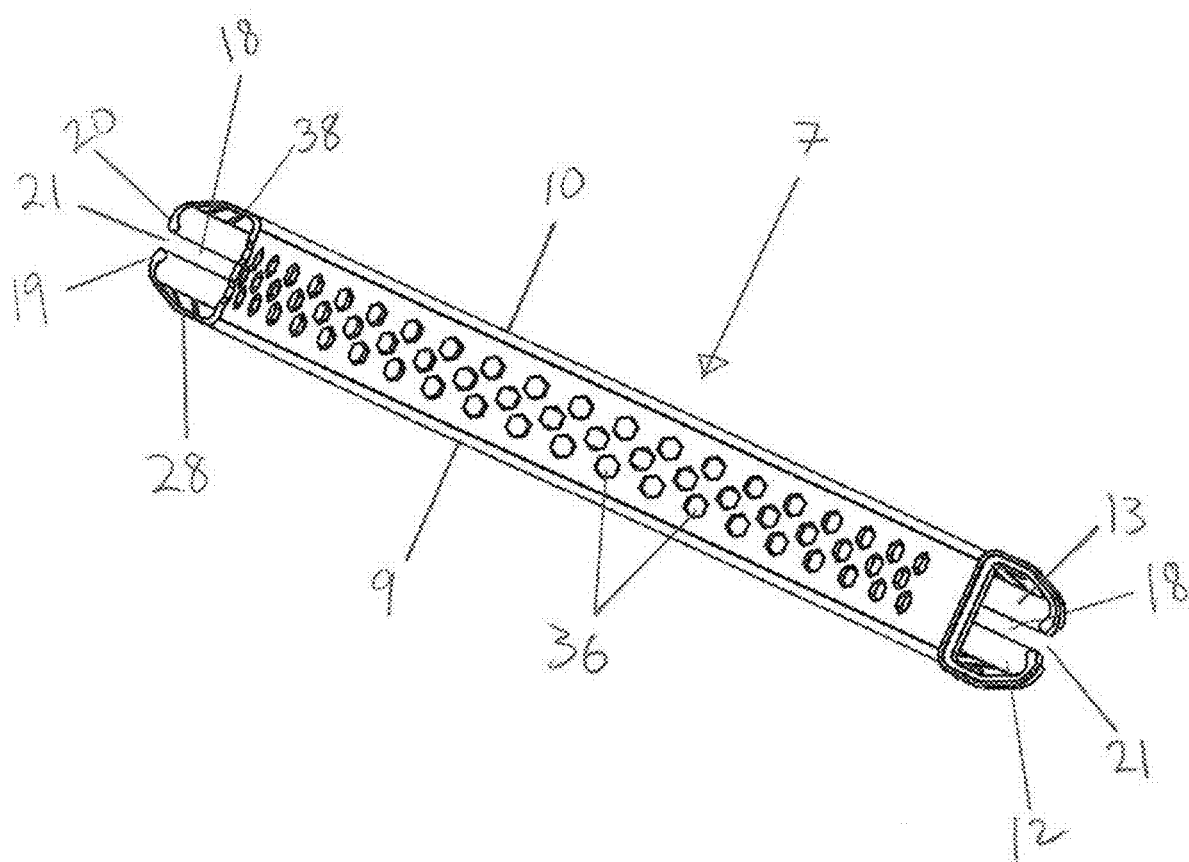
FIG. 9 shows an embodiment of the inventive technology, cut across a radius, of an embodiment of the inventive technology.
Figure 10:
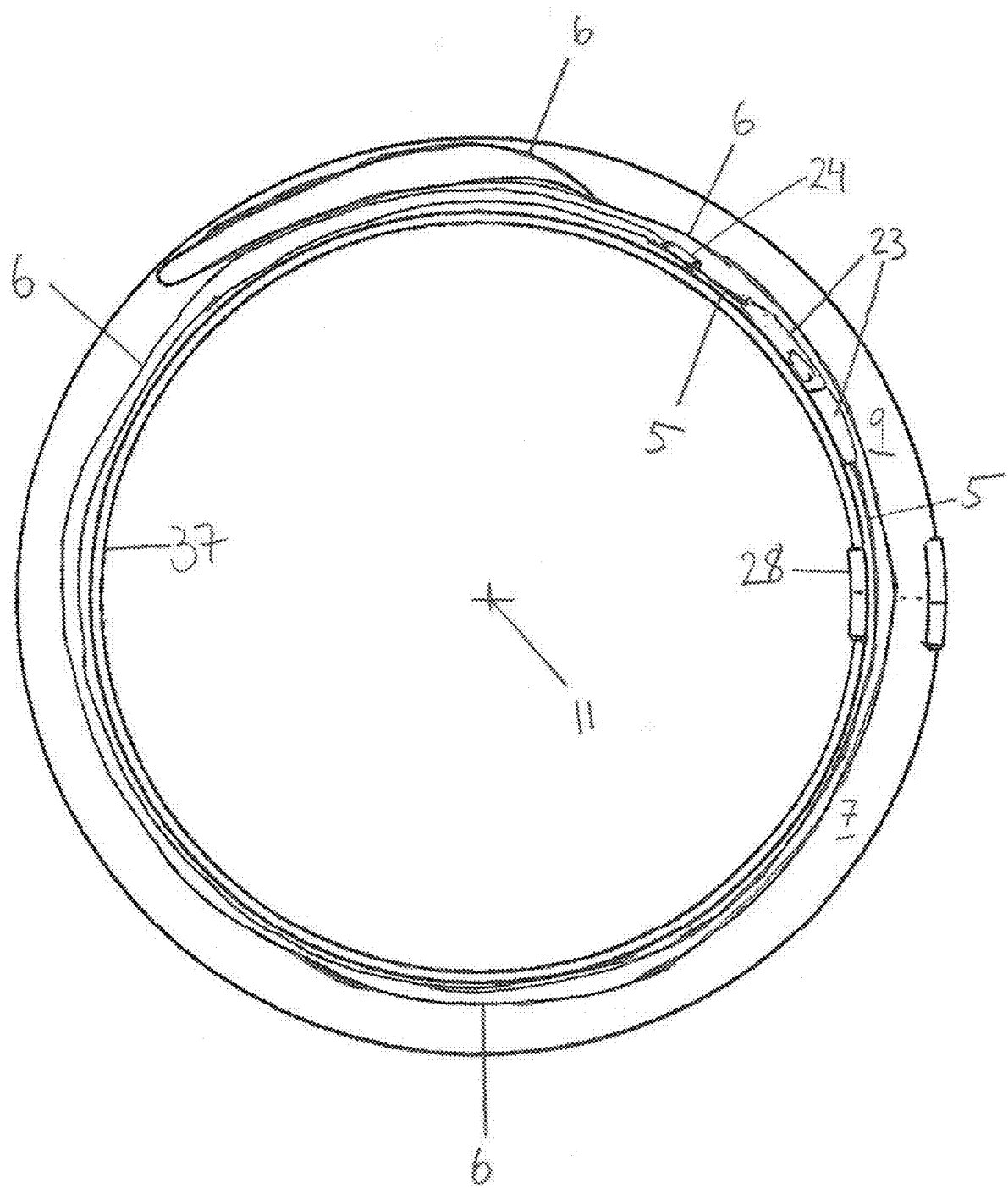
FIG. 10 shows a side, planar cross-sectional view of an embodiment of the inventive technology.
Figure 11:
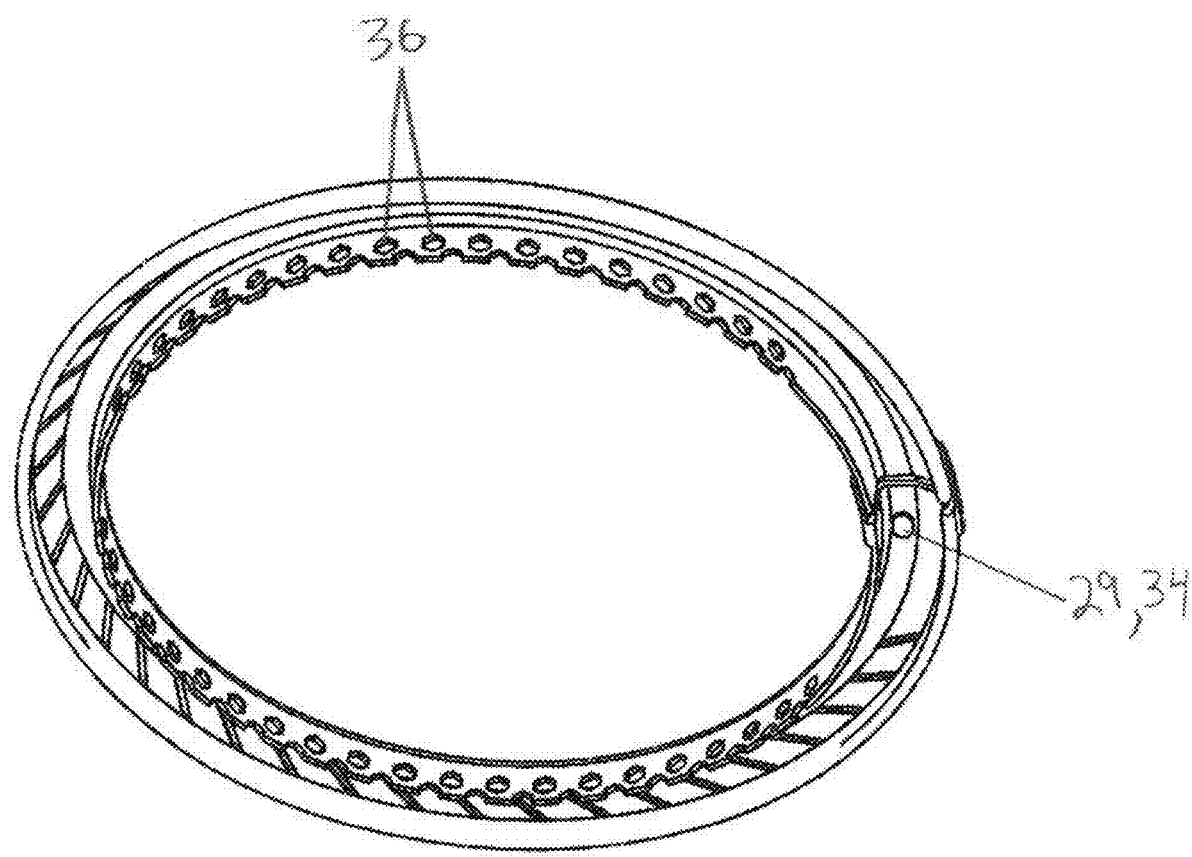
FIG. 11 shows side, perspective, planar cross-sectional view an embodiment of the inventive technology.
Figure 12:
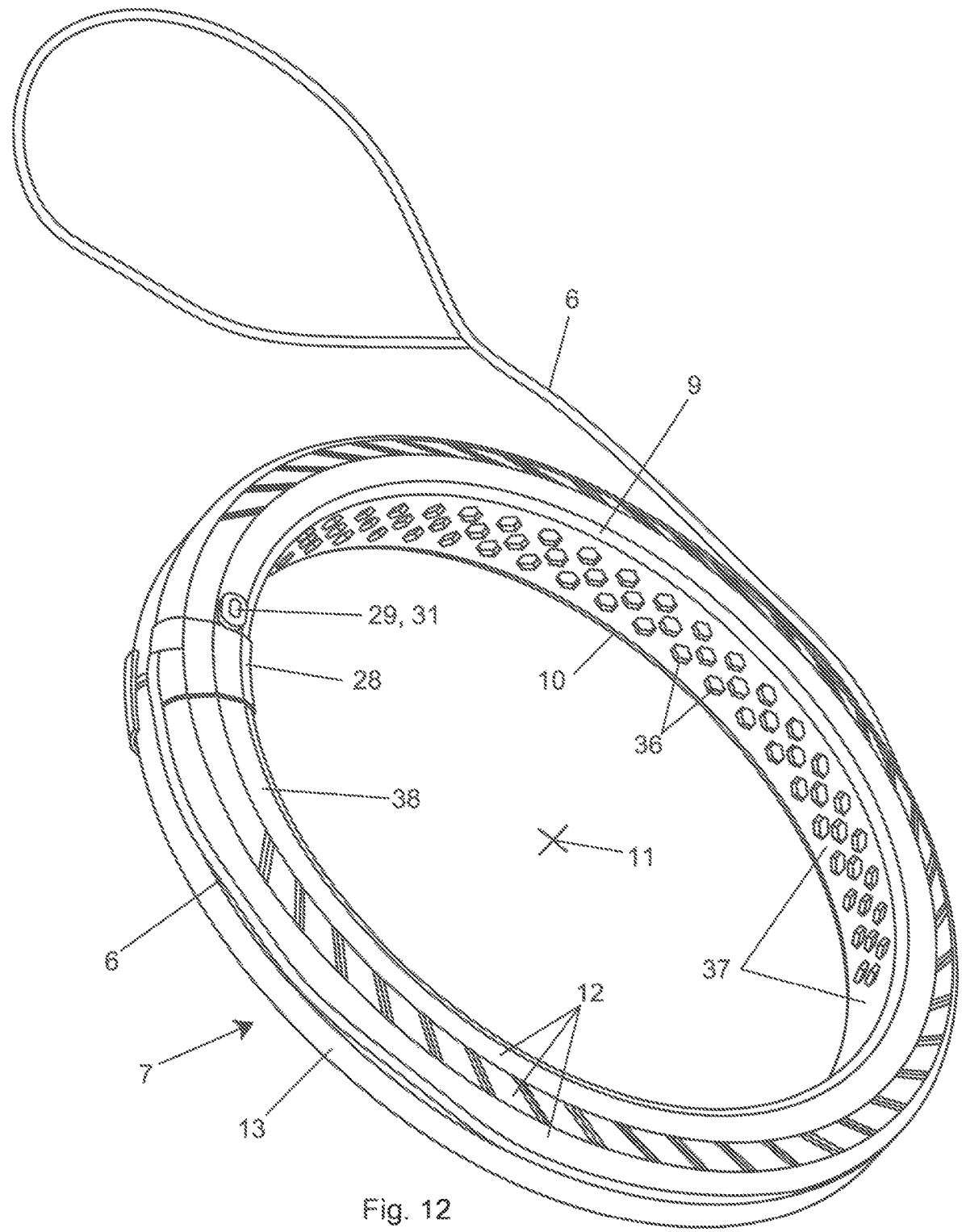
FIG. 12 shows a perspective side view of an embodiment of the inventive technology (in "partial" storing configuration).
Figure 13:
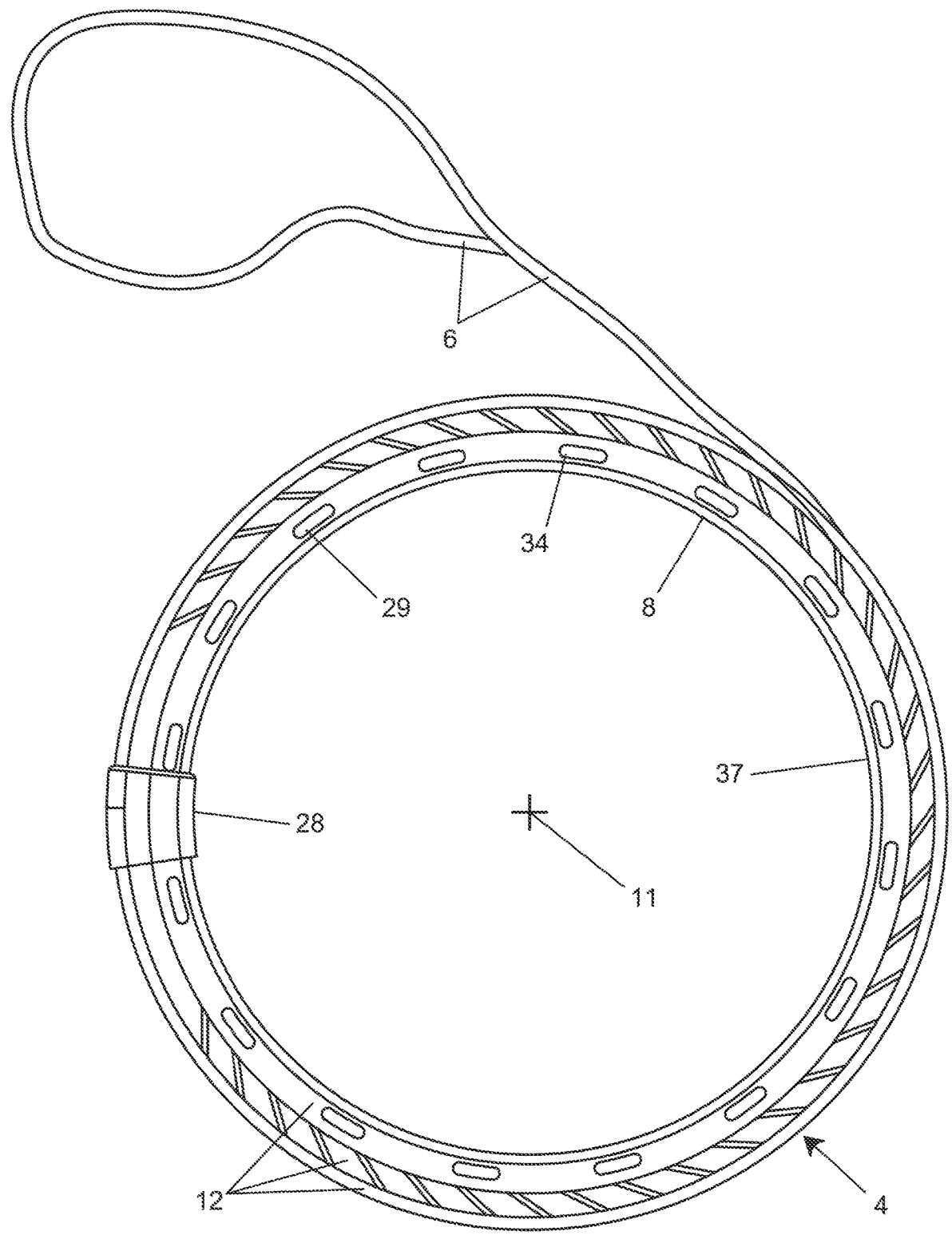
FIG. 13 shows a perspective side view of an embodiment of the inventive technology (in "partial" storing configuration).

In certain embodiments, the pet collar and its collar attachment componentry (e.g., buckle such as quick release buckle, and ring (on the collar, such as a D-ring)) and leash, perhaps with a loop at the end (for human hand), and its leash attachment componentry (e.g., metal or other type clip attached to the leash and clippable to the ring on the collar), and even perhaps an ID tag, can all be placed by human user into the sheath. If a collar is already on the pet, the sheath can be established under the collar, around the pet's neck, and the collar can be manually established (e.g., slid) into the channel of the sheath, segment by segment. If appropriate, the annular can be connected to itself at its two ends. The collar, if not already secured to itself (e.g., buckled), can then be secured, via a buckle or other collar adjustment device, while in the sheath. The leash can then, if not yet attached, be attached to the collar (e.g., to a D-ring of the collar), via, e.g., a snap clip of the leash or collar. In certain embodiments, the leash can then be established, around the collar, in the channel of the sheath, by: establishing a finger(s) (including a thumb) with fingertip(s) positioned inwards (towards the centroid of the sheath) into the channel to separate the outermost second portions of the two walls; rotating finger(s) around the outer part of the sheath, thereby opening the channel to accept the leash, which immediately "follows" the rotating finger(s); and manually feeding (e.g., winding) the leash into the temporary opening (created by the rotating finger(s))) with a thumb or second hand as the leading finger(s) rotate around the sheath. The biased walls of the sheath may then, after passage of the finger(s) and placement of the sheath into the channel, at least partially enclosed the collar and sheath. In such manner, the leash, including any loop at the "human end" of it may be placed in the sheath, enclosed in its channel. The biased (e.g., elastically biased) walls may keep the collar, and the leash that is wrapped circumferentially, and in layered fashion, around it (see, e.g., FIG. 8B), in the sheath (or more particularly, in its channel). Note that such method of "running" finger(s) in and around the channel of the sheath to establish the leash around the collar (already established in the sheath) can also be used to establish the (possibly unbuckled) collar in the sheath. Other manual methods of establishing (e.g., tucking) the collar and/or sheath in the channel of the sheath would be intuitive to the human user.

Advantageous designs may be configured (e.g., shaped and/or elastically biased) to store and substantially enclose within the channel of the sheath, a collar (includes collar attachment componentry, e.g., side release buckle) and leash (including its leash attachment componentry that attaches the leash to the collar, and, e.g., a loop at the human end of the leash) so that no parts of the leash (or collar) protrude from the sheath, so as to not snag on branches, etc., which might lead to pet injury. Indeed, when stored components are tucked inside the annular sheath, the apparatus, in its storing, adorned configuration, is without protrusions even where buckle or leash attachment componentry, or leash loop, is established inside the sheath, so there is less potential for the apparatus to snag.

It may be of note that while the above description and claims as originally filed may describe and annular sheath as including various elements and exhibiting various features, the invention may be alternately described as an annular sheath-type storage apparatus for a pet collar and a pet leash, and wearable by a pet that includes such various elements and exhibits such various features. Note that any features, components, etc., disclosed in Provisional Patent App. No. 62,887,482, incorporated herein in its entirety, may be combined in any fashion with (or indeed replace) technology explicitly disclosed herein.

As can be easily understood from the foregoing, the basic concepts of the present invention may be embodied in a variety of ways. It involves pet collar and leash storage techniques as well as devices to accomplish the appropriate storage. In this application, the storage techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this non-provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "storage apparatus" should be understood to encompass disclosure of the act of "storing"—whether explicitly discussed or not—and, conversely, were there effectively disclosure of the act of "storing", such a disclosure should be understood to encompass disclosure of a "storage apparatus" and even a "means for storing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as either or both: components that are configured to achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the leash and storage devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A storage apparatus for a pet collar and a pet leash, said storage apparatus wearable by a pet and comprising:

an annular sheath that comprises:

an inner base component having a first inner base component side and a second inner base component side;

a first wall and a second wall established outside of said inner base component, each of said two walls having a first portion and a second portion, said second portion of said first wall located outside of said first portion of said first wall, and said second portion of said second wall located outside of said first portion of said second wall, said first portion of said first wall connected to said inner base component at said first inner base component side and said first portion of said second wall connected to said inner base component at said second inner base component side;

a channel located outside of said inner base component and between said first and second walls;

a separation site that splits said annular sheath in a radial direction;

two ends that are proximate each other and located at said separation site; and a band connected at and forming one of said two ends and having an interior sized to slidably receive the other of said two ends; and a pet collar unbuckling facilitator that facilitates manual, pinch motion unbuckling of a pet collar buckled and stored inside of said channel of said annular sheath;

wherein said annular sheath defines a centroid of a shape defined by said annular sheath when it is in a non-storing, undonned configuration, wherein said second portion of said first wall and said second portion of said second wall converge towards each other as distance of said second portions from said centroid increases when said annular sheath is in said non-storing, undonned configuration, wherein said second portion of said first wall and said second portion of said second wall are biased towards each other, and wherein said pet collar unbuckling facilitator comprises an element selected from the group consisting of a set of two push buttons, a first of which is established on said first wall and a second of which is established on said second wall opposite said first push button; a set of two collar unbuckling facilitator holes, a first of which is established in said first wall and a second of which is established in said second wall opposite said first collar unbuckling facilitator hole; and first portions of said first and second walls that are opposite each other and easily deformed by manual pressure exerted by a human finger and thumb.

2. The storage apparatus for a pet collar and a pet leash as described in claim 1 wherein said second portions of said first and second walls each have an outermost second portion, and wherein said outermost second portions define an outer sheath perimeter, and wherein, when said annular sheath is in said non-storing, undonned configuration, said channel is partly exposed along a perimetrical split along said outer sheath perimeter.

3. The storage apparatus for a pet collar and a pet leash as described in claim 1 wherein said channel is sized to accept said pet collar, collar attachment componemry, said pet leash, and leash attachment componentry.

4. The storage apparatus for a pet collar and a pet leash as described in claim 1 wherein said second portion of said first wall and said second portion of said second wall are biased towards said centroid of said annular sheath.

5. The storage apparatus for a pet collar and a pet leash as described in claim 1 wherein a pet proximate inner surface of said inner base component is sufficiently slick to facilitate spinning of said annular sheath around a neck of a pet.

6. A storage apparatus for a pet collar and a pet leash, said storage apparatus wearable by a pet and comprising:
- an annular sheath that comprises:
  - an inner base component having a first inner base component side and a second inner base component side;
  - a first wall and a second wall established outside of said inner base component, each of said two walls having a first portion and a second portion, said second portion of said first wall located outside of said first portion of said first wall, and said second portion of said second wall located outside of said first portion of said second wall, said first portion of said first wall connected to said inner base component at said first inner base component side and said first portion of said second wall connected to said inner base component at said second inner base component side;
  - a channel located outside of said inner base component and between said first and second walls;
  - a separation site that splits said annular sheath in a radial direction;
  - two ends that are proximate each other and located at said separation site; and
  - a pet collar unbuckling facilitator that facilitates manual, pinch motion unbuckling of a pet collar buckled and stored inside of said channel of said annular sheath;
- wherein said annular sheath defines a centroid of a shape defined by said annular sheath when it is in a non-storing, undonned configuration,
- wherein said second portion of said first wall and said second portion of said second wall are biased towards each other,
- wherein at least one of said two ends fits within, and is slidable into, the other of said two ends, and
- wherein said pet collar unbuckling facilitator comprises an element selected from the group consisting of a set of two push buttons, a first of which is established on said first wall and a second of which is established on said second wall opposite said first push button; and a set of two collar unbuckling facilitator holes, a first of which is established in said first wall and a second of which is established in said second wall opposite said first collar unbuckling facilitator hole.

7. The storage apparatus for a pet collar and a pet leash as described in claim 6 wherein said annular sheath is flexible.

8. The storage apparatus for a pet collar and a pet leash as described in claim 6 and further comprising a band connected at and forming one of said two ends and having an interior sized to receive the other of said two ends.

9. The storage apparatus for a pet collar and a pet leash as described in claim 6 wherein said channel is sized to accept and store within, said pet collar, collar attachment componentry, said pet leash, and leash attachment componentry.

10. The storage apparatus for a pet collar and a pet leash as described in claim 6 wherein said second portion of said first wall and said second portion of said second wall are biased towards a centroid of said annular sheath.

11. The storage apparatus for a pet collar and a pet leash as described in claim 6 and further comprising holes in said inner base component.

12. The storage apparatus for a pet collar and a pet leash as described in claim 6 wherein said annular sheath is not attached to either said pet collar or said pet leash.

13. A storage apparatus for a pet collar and a pet leash, said storage apparatus wearable by a pet, configured as an annular sheath, and comprising:
- an inner base component having a first inner base component side and a second inner base component side;
- a first wall and a second wall established outside of said inner base component, each of said two walls having a first portion and a second portion, said second portion of said first wall located outside of said first portion of said first wall, and said second portion of said second wall located outside of said first portion of said second wall, said first portion of said first wall connected to said inner base component at said first inner base component side and said first portion of said second wall connected to said inner base component at said second inner base component side;
- a channel located outside of said inner base component and between said first and second walls;
- a separation site that splits said annular sheath in a radial direction; and
- two ends that are proximate each other and located at said separation site; and
- a pet collar unbuckling facilitator that facilitates manual, pinch motion unbuckling of a pet collar buckled and stored inside of said channel,
- wherein said storage apparatus defines a centroid of a shape when it is in a non-storing, undonned configuration,
- wherein said second portion of said first wall and said second portion of said second wall are biased towards each other, and
- wherein said pet collar unbuckling facilitator comprises an element selected from the group consisting of a set of two push buttons a first of which is established on said first wall and a second of which is established on said second wall opposite said first push button; a set of two collar unbuckling facilitator holes, a first of which is established in said first wall and a second of which is established in said second wall opposite said first collar unbuckling facilitator hole; and first portions of said first and second walls that are opposite each other and easily deformed by manual pressure exerted by a human finger and thumb.

14. The storage apparatus for a pet collar and a pet leash as described in claim 13 wherein at least one of said two ends fits within, and is slidable into, the other of said two ends.

15. A storage apparatus for a pet collar and a pet leash said storage apparatus wearable by a pet, and comprising:
- an annular sheath that comprises:
  - an inner base component having a first inner base component side and a second inner base component side;
  - a first wall and a second wall established outside of said inner base component, each of said two walls having a first portion and a second portion, said second portion of said first wall located outside of said first portion of said first wall, and said second portion of said second wall located outside of said first portion of said second wall, said first portion of said first wall connected to said inner base component at said first inner base component side and said first portion of said second wall connected to said inner base component at said second inner base component side;
  - a channel located outside of said inner base component and between said first and second walls;

a separation site that splits said annular sheath in a radial direction;

two ends that are proximate each other and located at said separation site; and a pet collar unbuckling facilitator that facilitates manual, pinch motion unbuckling of a pet collar buckled and stored inside of said channel of said annular sheath;

wherein said annular sheath defines a centroid of a shape defined by said annular sheath when it is in a non-storing, undonned configuration, wherein said second portion of said first wall and said second portion of said second wall are biased towards each other, wherein at least one of said two ends fits within, and is slidable into, the other of said two ends, and wherein said pet collar unbuckling facilitator comprises first portions of said first and second walls that are opposite each other and easily deformed by manual pressure exerted by a human finger and thumb.

16. The storage apparatus for a pet collar and a pet leash as described in claim 15 and further comprising a band connected at and forming one of said two ends and having an interior sized to receive the other of said two ends.

17. The storage apparatus for a pet collar and a pet leash as described in claim 15 wherein said channel is sized to accept and store within, said pet collar, collar attachment componentry, said pet leash, and leash attachment componentry.

18. The storage apparatus for a pet collar and a pet leash as described in claim 15 wherein said second portion of said first wall and said second portion of said second wall are biased towards a centroid of said annular sheath.

19. The storage apparatus for a pet collar and a pet leash as described in claim 15 and further comprising holes in said inner base component.

20. The storage apparatus for a pet collar and a pet leash as described in claim 15 wherein said annular sheath is not attached to either said pet collar or said pet leash.

* * * * *